(12) United States Patent
Delgo et al.

(10) Patent No.: US 9,031,974 B2
(45) Date of Patent: May 12, 2015

(54) APPARATUS AND SOFTWARE SYSTEM FOR AND METHOD OF PERFORMING A VISUAL-RELEVANCE-RANK SUBSEQUENT SEARCH

(75) Inventors: Lior Delgo, Saratoga, CA (US); Eitan Sharon, San Mateo, CA (US); Achiezer Brandt, San Mateo, CA (US); Eran Borenstein, Oakland, CA (US); Asael Moshe, Sunnyvale, CA (US)

(73) Assignee: Videosurf, Inc., San Mateo, CA (US)

( * ) Notice: Subject to any disclaimer, the term of this patent is extended or adjusted under 35 U.S.C. 154(b) by 0 days.

(21) Appl. No.: 13/619,550

(22) Filed: Sep. 14, 2012

(65) Prior Publication Data
US 2013/0014016 A1 Jan. 10, 2013

Related U.S. Application Data

(63) Continuation of application No. 12/502,202, filed on Jul. 13, 2009, now Pat. No. 8,364,698.

(60) Provisional application No. 61/079,845, filed on Jul. 11, 2008.

(51) Int. Cl.
*G06F 3/01* (2006.01)
*G11B 27/34* (2006.01)
(Continued)

(52) U.S. Cl.
CPC ............ *G11B 27/34* (2013.01); *G06F 17/3079* (2013.01); *G06F 17/30843* (2013.01);
(Continued)

(58) Field of Classification Search
CPC ............... G06F 17/30843; G06F 17/30796; G06F 17/3084; G06F 17/3079; G06F 17/30825; G06F 17/30831; G06F 17/30793; G06F 17/30849; G06F 17/30991; G06F 17/30858; G06F 17/30247; G06F 17/30259; G06K 9/00711
USPC .......................................... 715/723; 707/769
See application file for complete search history.

(56) References Cited

U.S. PATENT DOCUMENTS

| 4,639,773 A | 1/1987 | Hurst |
| 4,739,398 A | 4/1988 | Thomas et al. |

(Continued)

FOREIGN PATENT DOCUMENTS

| CN | 1199449 C | 4/2005 |
| EP | 1152621 A1 | 11/2001 |

(Continued)

OTHER PUBLICATIONS

Notice of Allowance mailed Sep. 24, 2012, in U.S. Appl. No. 11/687,261, filed Mar. 16, 2007.

(Continued)

*Primary Examiner* — Jean B Fleurantin
*Assistant Examiner* — Evan Aspinwall
(74) *Attorney, Agent, or Firm* — Nicholas Chen; Kate Drakos; Micky Minhas

(57) ABSTRACT

A method analyzes the visual content of media such as videos for collecting together visually-similar appearances in their constituent images (e.g. same scenes, same objects, faces of the same people.) As a result, the most relevant and salient (of clearest and largest presence) visual appearances depicted in the videos are presented to the user, both for the sake of summarizing the video content for the users to "see before they watch" (that is, judge by the depicted video content in a filmstrip-like summary whether they want to mouse-click on the video and actually spend time watching it), as well as for allowing to users to further refine their video search result set according to the most relevant and salient video content returned (e.g. largest screen-time faces).

19 Claims, 4 Drawing Sheets

(51) Int. Cl.
  *G06F 17/30* (2006.01)
  *G11B 27/28* (2006.01)
  *G11B 27/32* (2006.01)

(52) U.S. Cl.
  CPC .... *G06F17/30849* (2013.01); *G06F 17/30852* (2013.01); *G11B 27/28* (2013.01); *G11B 27/329* (2013.01); *G06F 17/3082* (2013.01); *G06F 17/30793* (2013.01)

(56) References Cited

U.S. PATENT DOCUMENTS

| | | | |
|---|---|---|---|
| 5,392,223 | A | 2/1995 | Caci |
| 5,410,643 | A | 4/1995 | Yomdin et al. |
| 5,473,384 | A | 12/1995 | Jayant et al. |
| 5,574,764 | A | 11/1996 | Granfors et al. |
| 5,638,135 | A | 6/1997 | Mukai |
| 5,838,838 | A | 11/1998 | Overton |
| 5,886,745 | A | 3/1999 | Muraji et al. |
| 5,923,775 | A | 7/1999 | Snyder et al. |
| 6,229,929 | B1 | 5/2001 | Lynch et al. |
| 6,370,543 | B2 | 4/2002 | Hoffert et al. |
| 6,396,948 | B1 | 5/2002 | Lynch et al. |
| 6,400,844 | B1 | 6/2002 | Fan et al. |
| 6,442,203 | B1 | 8/2002 | Demos |
| 6,449,608 | B1 | 9/2002 | Morita et al. |
| 6,462,768 | B1 | 10/2002 | Oakley |
| 6,611,296 | B1 | 8/2003 | Nieuwenhuizen et al. |
| 6,643,387 | B1 | 11/2003 | Sethuraman et al. |
| 6,714,929 | B1 | 3/2004 | Micaelian et al. |
| 6,718,365 | B1 | 4/2004 | Dutta |
| 6,741,655 | B1* | 5/2004 | Chang et al. ............. 375/240.26 |
| 6,766,037 | B1 | 7/2004 | Le et al. |
| 6,774,917 | B1 | 8/2004 | Foote et al. |
| 6,792,575 | B1 | 9/2004 | Samaniego et al. |
| 6,850,651 | B2 | 2/2005 | Zaklika et al. |
| 6,891,891 | B2 | 5/2005 | Pau et al. |
| 7,031,555 | B2 | 4/2006 | Troyanker |
| 7,042,527 | B2 | 5/2006 | Imai |
| 7,042,639 | B1 | 5/2006 | McDowell |
| 7,043,078 | B2 | 5/2006 | Guleryuz |
| 7,080,392 | B1 | 7/2006 | Geshwind |
| 7,120,195 | B2 | 10/2006 | Patti et al. |
| 7,124,365 | B2 | 10/2006 | Cavallerano et al. |
| 7,136,524 | B1 | 11/2006 | Goh et al. |
| 7,146,361 | B2 | 12/2006 | Broder et al. |
| 7,149,355 | B2 | 12/2006 | Kubota |
| 7,190,832 | B2 | 3/2007 | Frost et al. |
| 7,246,314 | B2 | 7/2007 | Foote et al. |
| 7,268,939 | B1 | 9/2007 | McDowell |
| 7,274,828 | B2 | 9/2007 | Wang et al. |
| 7,349,922 | B2 | 3/2008 | Brandt et al. |
| 7,400,680 | B2 | 7/2008 | Jiang |
| 7,421,455 | B2 | 9/2008 | Hua et al. |
| 7,555,718 | B2 | 6/2009 | Girgensohn et al. |
| 7,603,342 | B2 | 10/2009 | Gosse et al. |
| 7,782,954 | B2 | 8/2010 | Liang et al. |
| 7,920,748 | B2 | 4/2011 | Sharon et al. |
| 8,009,897 | B2 | 8/2011 | Xu et al. |
| 8,059,915 | B2 | 11/2011 | Sharon et al. |
| 8,139,067 | B2 | 3/2012 | Anguelov et al. |
| 8,145,656 | B2 | 3/2012 | Shatz et al. |
| 8,233,545 | B2 | 7/2012 | Ahuja et al. |
| 8,364,660 | B2 | 1/2013 | Delgo et al. |
| 8,364,698 | B2 | 1/2013 | Delgo et al. |
| 8,379,915 | B2 | 2/2013 | Sharon et al. |
| 8,488,839 | B2 | 7/2013 | Sharon et al. |
| 2001/0049826 | A1 | 12/2001 | Wilf |
| 2002/0003900 | A1 | 1/2002 | Kondo |
| 2002/0114394 | A1 | 8/2002 | Ma |
| 2003/0088554 | A1 | 5/2003 | Ryan et al. |
| 2003/0097301 | A1 | 5/2003 | Kageyama et al. |
| 2003/0120652 | A1 | 6/2003 | Tifft |
| 2003/0234803 | A1* | 12/2003 | Toyama et al. ............. 345/716 |
| 2004/0013305 | A1 | 1/2004 | Brandt et al. |
| 2004/0081239 | A1 | 4/2004 | Patti et al. |
| 2004/0125877 | A1 | 7/2004 | Chang et al. |
| 2004/0240725 | A1 | 12/2004 | Xu et al. |
| 2005/0050023 | A1 | 3/2005 | Gosse et al. |
| 2005/0069037 | A1 | 3/2005 | Jiang |
| 2005/0179814 | A1 | 8/2005 | Pau et al. |
| 2005/0216851 | A1 | 9/2005 | Hull et al. |
| 2005/0275626 | A1 | 12/2005 | Mueller et al. |
| 2006/0059120 | A1 | 3/2006 | Xiong et al. |
| 2006/0075237 | A1 | 4/2006 | Seo et al. |
| 2006/0122839 | A1 | 6/2006 | Li et al. |
| 2006/0122997 | A1 | 6/2006 | Lin |
| 2006/0291567 | A1 | 12/2006 | Filippini et al. |
| 2007/0070226 | A1 | 3/2007 | Matusik et al. |
| 2007/0078832 | A1 | 4/2007 | Ott et al. |
| 2007/0106952 | A1 | 5/2007 | Matas et al. |
| 2007/0157239 | A1 | 7/2007 | Wang et al. |
| 2007/0185858 | A1 | 8/2007 | Lu et al. |
| 2007/0203942 | A1* | 8/2007 | Hua et al. ............. 707/104.1 |
| 2008/0021710 | A1 | 1/2008 | Ho |
| 2008/0080743 | A1 | 4/2008 | Schneiderman et al. |
| 2008/0086688 | A1 | 4/2008 | Chandratillake et al. |
| 2008/0118107 | A1 | 5/2008 | Sharon et al. |
| 2008/0118108 | A1 | 5/2008 | Sharon et al. |
| 2008/0120290 | A1 | 5/2008 | Delgo et al. |
| 2008/0120291 | A1 | 5/2008 | Delgo et al. |
| 2008/0120328 | A1 | 5/2008 | Delgo et al. |
| 2008/0154889 | A1 | 6/2008 | Pfeiffer |
| 2008/0159622 | A1 | 7/2008 | Agnihotri et al. |
| 2008/0159630 | A1 | 7/2008 | Sharon et al. |
| 2008/0193017 | A1 | 8/2008 | Wilson et al. |
| 2008/0292187 | A1 | 11/2008 | Eitan et al. |
| 2008/0292188 | A1 | 11/2008 | Eitan et al. |
| 2009/0083228 | A1 | 3/2009 | Shatz et al. |
| 2009/0141940 | A1 | 6/2009 | Zhao et al. |
| 2009/0271398 | A1 | 10/2009 | Scherf et al. |
| 2010/0034467 | A1 | 2/2010 | Yu et al. |
| 2010/0057694 | A1 | 3/2010 | Kunjithapatham et al. |
| 2010/0070483 | A1 | 3/2010 | Delgo et al. |
| 2010/0070523 | A1 | 3/2010 | Delgo et al. |
| 2010/0082585 | A1 | 4/2010 | Barsook et al. |
| 2010/0104261 | A1 | 4/2010 | Liu et al. |
| 2010/0205203 | A1 | 8/2010 | Anderson et al. |
| 2012/0008821 | A1 | 1/2012 | Sharon et al. |
| 2013/0014016 | A1 | 1/2013 | Delgo et al. |
| 2013/0016897 | A1 | 1/2013 | Cho et al. |
| 2013/0326573 | A1 | 12/2013 | Sharon et al. |

FOREIGN PATENT DOCUMENTS

EP 1732329 A1 12/2006
JP 6105211 4/1994

OTHER PUBLICATIONS

Amendment dated May 30, 2012, in U.S. Appl. No. 11/687,261, filed Mar. 16, 2007.
Office Action dated Mar. 23, 2011, in U.S. Appl. No. 11/687,261, filed Mar. 16, 2007.
Amendment dated Feb. 28, 2011, in U.S. Appl. No. 11/687,261, filed Mar. 16, 2007.
Office Action dated Aug. 26, 2010, in U.S. Appl. No. 11/687,261, filed Mar. 16, 2007.
Notice of Allowance mailed Mar. 15, 2013, in U.S. Appl. No. 11/687,341, filed Mar. 16, 2007.
Amendment dated Jan. 18, 2013, in U.S. Appl. No. 11/687,341, filed Mar. 16, 2007.
Office Action dated Jul. 19, 2012, in U.S. Appl. No. 11/687,341, filed Mar. 16, 2007.
Amendment dated May 30, 2012, in U.S. Appl. No. 11/687,341, filed Mar. 16, 2007.
Office Action dated Mar. 23, 2011, in U.S. Appl. No. 11/687,341, filed Mar. 16, 2007.
Amendment dated Feb. 28, 2011, in U.S. Appl. No. 11/687,341, filed Mar. 16, 2007.
Office Action dated Aug. 26, 2010, in U.S. Appl. No. 11/687,341, filed Mar. 16, 2007.

(56) References Cited

OTHER PUBLICATIONS

Notice of Allowance mailed Sep. 27, 2012, in U.S. Appl. No. 12/502,206, filed Jul. 13, 2009.
Notice of Allowance mailed Aug. 17, 2012, in U.S. Appl. No. 12/502,206, filed Jul. 13, 2009.
Amendment dated May 21, 2012, in U.S. Appl. No. 12/502,206, filed Jul. 13, 2009.
Office Action dated Nov. 21, 2011, in U.S. Appl. No. 12/502,206, filed Jul. 13, 2009.
Office Action dated Mar. 29, 2011, in U.S. Appl. No. 12/502,206, filed Jul. 13, 2009.
Office Action dated May 9, 2013, in U.S. Appl. No. 13/104,793, filed May 10, 2011.
International Search Report and Written Opinion issued for PCT/US2007/024197; dated May 19, 2008; 4 pages.
International Preliminary Report on Patentability and Written Opinion dated Jun. 4, 2009, directed at related application No. PCT/US2007/024198; 9 pages.
International Search Report mailed on May 22, 2008, directed at counterpart application No. PCT/US2007/024199; 5 pages.
International Search Report mailed on Aug. 24, 2009, directed to international application No. PCT/US2009/50409; 11 pages.
"Object Classification by Statistics of Multi-scale Edges Based on BD Integrals," Anonymous CVPR submission, Paper ID 1413, 1-6. Nov. 15, 2009.
Aji, et al. (Mar. 2000). "The Generalized Distributive Law", IEEE Transactions on Information Theory 46(2):325-343.
Bhattacharyya. (1943)."On a measure of divergence between two statistical populations defined by their probability distributions", Bulletin of the Calcutta Mathematical Society 35: 99-109. MR0010358.
Borenstein et al., "Combining Top-Down and Bottom-up Segmentation," Proceedings IEEE Workshop on Perceptual Organization in Computer Vision, 2004 Conference on Computer Vision and Pattern Recognition Workshop, Washington, DC. 27-02 Jun. 2004, 1-8.
Bourke, Intersection Point of Two Lines (2 Dimensions), http://local.wasp.uwa.edu.au/-pbourke/geometryllineline2d/, (Apr. 1989), 1-2.
Brandt et al. "Fast Calculation of Multiple Line Integrals;" SIAM J. Sci. Comput., 1999, 1417-1429, vol. 20(4).
Cai et al., "Mining Association Rules with Weighted Items," Database Engineering and Applications Symposium, 1998. Proceedings. IDEAS'98. International, Jul. 8-10, 1998, 68-77.
Corso et al., "Multilevel Segmentation and Integrated Bayesian Model Classification with an Application to Brain Tumor Segmentation," Medical Image Computing and Computer-Assisted Intervention (MICCAI), 2006, Appeared in Springer's "Lecture Notes in Computer Science.".
Galun et al., "Texture Segmentation by Multiscale Aggregation of Filter Responses and Shape Elements," Proceedings IEEE International Conference on Computer Vision, 716-723, Nice, France, 2003.
Gorelick et al., "Shape Representation and Classification Using the Poisson Equation," IEEE Transactions on Pattern Analysis and Machine Intelligence, Dec. 2006, 1991-2005, vol. 28(12).
Lee et al., "A Motion Adaptive De-interfacing Method Using an Efficient Spatial and Temporal Interpolation," IEEE Transactions on Consumer Electronics, 2003, 1266-1271, vol. 49(4).
Lindley, "Creation of an MPEG-7 Feature Extraction Plug in for the platform METIS," Universitat Wienl TU Wien, 2006, Betreuer: R. King, W. Klas.
Lowe, (Sep. 1999) "Object recognition from local scale-invariant features". Proc. of International Conference on Computer Vision, Corfu. 8 pages.
Lucas et al., "An Iterative Image Registration Technique with an Application to Stereo Vision," Proceedings of Imaging Understanding Workshop, 1981, 121-129.
Mikolajczyk et al., (Oct. 2005). "A performance evaluation of local descriptors". IEEE Computer Society. IEEE Transactions on Pattern Analysis and Machine Intelligence. 27(10): 1615-1630.

Ng et al., "On Spectral Clustering: Analysis and an algorithm," 2001. http://citeseerx.ist.psu.edu/viewdoc/summary?doi=1 0.1.1.19.81 00.
Okuma et al., A boosted particle filter: Multi-target detection and tracking, ECCV, 2004. http://www.sprinQerlink.com/contentlwyf1nw3xw53xjnf3/.
Polimeni, "Space-time Adaptive Image Representations: Data Structures, Hardware and Algorithms," located at <http://eslab.bu.edu/publications/proceedings/2001 /polimeni100'spacetime.pdf> visited on Aug. 13, 2009. (23 pages).
Rabiner "A tutorial on Hidden Markov Models and selected applications in speech recognition". (Feb. 1989).
Sharon et al., (Oct. 2000) "Completion Energies and Scale," IEEE Transactions on Pattern Analysis and Machine Intelligence. 22(10):1117-1131.
Sharon et al., "Fast Multiscale Image Segmentation," Proceedings IEEE Conference on Computer Vision and Pattern Recognition, 1:70-77, South Carolina, 2000.
Sharon et al., "2D-Shape Analysis using Conformal Mapping," Division of Applied Mathematics, Brown University, 1-31. 2005.
Sharon et al., "2D-Shape analysis using Conformal Mapping," Proceedings IEEE Conference on Computer Vision and Pattern Recognition, Washington, DC, 2004. 1-8.
Sharon et al., "Completion Energies and Scale," Proceedings IEEE Conference on Computer Vision and Pattern Recognition, 1997, 884-890, Puerto Rico.
Sharon et al., "Hierarchy and Adaptivity in Segmenting Visual Scenes," Nature, Jun. 28, 2006 online; Aug. 17 print, 1-4.
Sharon et al., "Segmentation and Boundary Detection Using Multiscale Intensity Measurements," Proceedings IEEE Conference on Computer Vision and Pattern Recognition, I: 469-476, Kauai, Hawaii, 2001.
Shi et al., "Good Features to Track," 1994 IEEE Conference on Computer Vision and Pattern Recognition (CVPR'94), 1994, 593-600.
Viola et al., "Rapid object detection using a boosted cascacd of simple features," Proc. Computer Vision and Pattern Recognition, 2001.
Tao et al., "Weighted Association Rule Mining using Weighted Support and Significance Framework," In: The Ninth ACM SIGKDD International Conference on Knowledge Discovery and Data MininQ(ACM SIGKDD 2003), Aug. 24-27, 2003, Washington, DC, USA.
International Search Report mailed on Sep. 22, 2008, directed at counterpart application No. PCT/US2008/64683; 1 page.
Notice of Allowance mailed Sep. 24, 2012, in U.S. Appl. No. 12/502,202, filed Jul. 13, 2009.
Notice of Allowance mailed Jul. 11, 2012, in U.S. Appl. No. 12/502,202, filed Jul. 13, 2009.
Amendment mailed May 23, 2012, in U.S. Appl. No. 12/502,202, filed Jul. 13, 2009.
Office Action mailed Nov. 23, 2012, in U.S. Appl. No. 12/502,202, filed Jul. 13, 2009.
Amendment mailed Sep. 23, 2011, in U.S. Appl. No. 12/502,202, filed Jul. 13, 2009.
Office Action mailed Mar. 23, 2011, in U.S. Appl. No. 12/502,202, filed Jul. 13, 2009.
Office Action dated Feb. 13, 2014, U.S. Appl. No. 13/104,793, filed May 10, 2011.
Amendment dated Nov. 12, 2013, in U.S. Appl. No. 13/104,793, filed May 10, 2011.
Response to Office Action dated Jun. 13, 2014 in U.S. Appl. No. 13/104,793, filed May 10, 2011.
Office Action dated Jul. 2, 2014 in U.S. Appl. No. 13/104,793, filed May 10, 2011.
Response to Office Action dated Dec. 2, 2014 in U.S. Appl. No. 13/104,793, filed May 10, 2011.

* cited by examiner

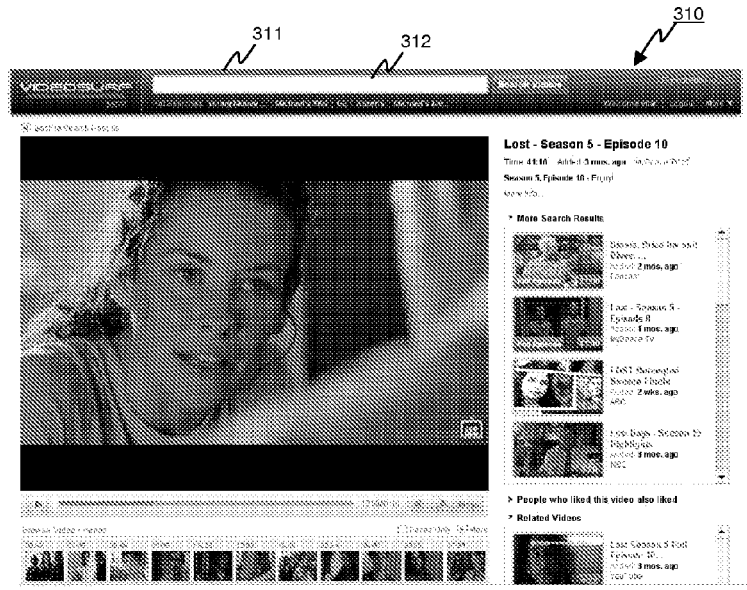
*FIG. 5*
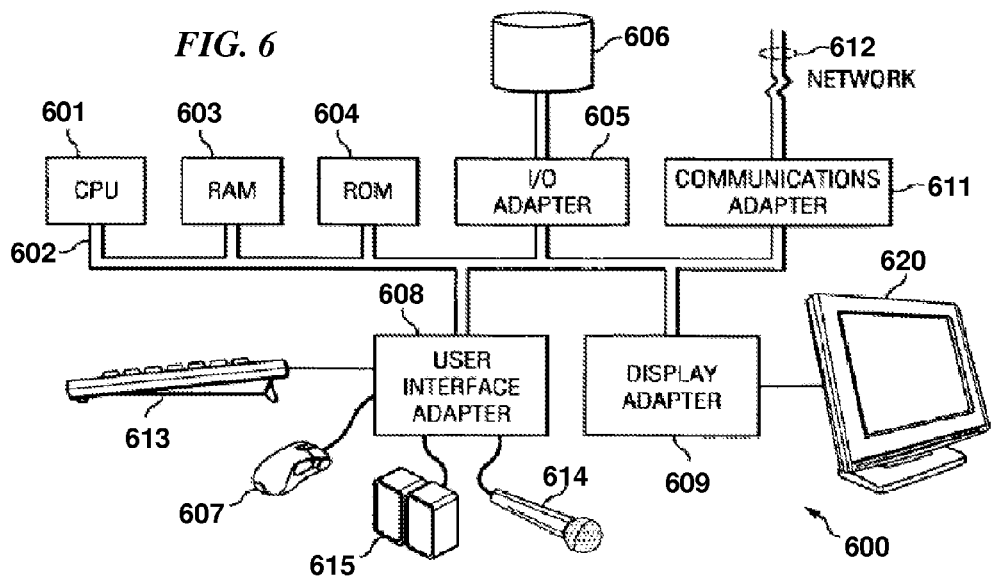

APPARATUS AND SOFTWARE SYSTEM FOR AND METHOD OF PERFORMING A VISUAL-RELEVANCE-RANK SUBSEQUENT SEARCH

CLAIM OF PRIORITY

This application is a continuation application of U.S. patent application Ser. No. 12/502,202, entitled "APPARATUS AND SOFTWARE SYSTEM FOR AND METHOD OF PERFORMING A VISUAL-RELEVANCE-RANK SUBSEQUENT SEARCH," filed Jul. 13, 2009, which claims priority to U.S. Provisional Application No. 61/079,845 filed Jul. 11, 2008 and is related to prior U.S. Pat. No. 7,920,748 issued Apr. 5, 2011, U.S. Pat. No. 7,903,899 issued Mar. 8, 2011, U.S. Pat. No. 8,059,915 issued Nov. 15, 2011, each of which are specifically and fully incorporated herein by reference in its entirety.

FIELD OF THE INVENTION

The invention is directed to searching content including video and multimedia and, more particularly, to searching video content and presenting candidate results based on relevance and suggesting subsequent narrowing and additional searches based on rankings of prior search results.

BACKGROUND

The prior art includes various searching methods and systems directed to identifying and retrieving content based on key words found in the file name, tags on associated web pages, transcripts, text of hyperlinks pointing to the content, etc. Such search methods rely on Boolean operators indicative of the presence or absence of search terms. However, a more robust search method is required to identify content satisfying search requirements and to enhance searching techniques related to video and multimedia content and objects.

SUMMARY OF THE INVENTION

The invention is directed to a robust search method providing for enhanced searching of content taking into consideration not only the existence (or absence) of certain characteristics (as might be indicated by corresponding "tags" attached to the content or portions thereof, e.g., files), but the importance of those characteristics with respect to the content. Tags may name or describe a feature, quality of, and/or objects associated with the content (e.g., video file) and/or of objects appearing in the content (e.g., an object appearing within a video file and/or associated with one or more objects appearing in a video file and/or associated with objects appearing in the video file.)

Search results, whether or not based on search criteria specifying importance values, may include importance values for the tags that were searched for and identified within the content. Additional tags (e.g., tags not part of the preceding queried search terms) may also be provided and displayed to the user including, for example, tags for other characteristics suggested by the preceding search and/or suggested tags that might be useful as part of a subsequent search. Suggested tags may be based in part on past search histories, user profile information, etc. and/or may be directed to related products and/or services suggested by the prior search or search results.

Results of searches may further include a display of "thumbnails" corresponding and linking to content most closely satisfying search criteria, the thumbnails arranged in order of match quality with the size of the thumbnail indicative of its match quality (e.g., best matching video files indicated by large thumbnail images, next best by intermediate size thumbnails, etc.) As used herein, the term "thumbnail" includes a frame representing a scene, typically the frame image itself extracted from the set of frames constituting the scene or "shot". However, a thumbnail may be a static image extracted from a portion of a frame from the scene, an image generated to otherwise correspond to the imagery content of the scene, or a dynamic image including motion, an interactive image providing additional viewing and user functionality including zooming, display of adjacent frames of the scene (e.g., a filmstrip of sub-scenes or adjacent frames), etc. A user may click on and/or hover over a thumbnail to enlarge the thumbnail, be presented with a preview of the content (e.g., a video clip most relevant to the search terms and criteria) and/or to retrieve or otherwise access the content.

Often the format of the search results, e.g. thumbnails, does not readily provide a satisfactory reorientation of the identified object, e.g., the content of an entire video typically including several scenes. Further, the display of search results may not be tightly integrated, if at all, with an appropriate user interface that may not readily assist the user to narrow, redirect and/or redefine a search without requiring creation of a new query expression.

Note, as used herein, the term "scene" may include a sequence of frames in which there is some commonality of objects appearing in the frames including either or both foreground and background objects. A scene may comprise contiguous or discontinuous sequences of frames of a video.

Embodiments of the present invention include apparatus, software and methods that analyze the visual content of media such as videos for collecting together visually-similar appearances in their constituent images (e.g. same scenes, same objects, faces of the same people.) As a result, the most relevant and salient (of clearest and largest presence) visual appearances depicted in the videos are presented to the user, both for the sake of summarizing the video content for the users to "see before they watch" (that is, judge by the depicted video content in a filmstrip-like summary whether they want to mouse-click on the video and actually spend time watching it), as well as for allowing to users to further refine their video search result set according to the most relevant and salient video content returned (e.g. largest screen-time faces).

While the following description of a preferred embodiment of the invention uses an example based on indexing and searching of video content, e.g., video files, visual objects, etc., embodiments of the invention are equally applicable to processing, organizing, storing and searching a wide range of content types including video, audio, text and signal files. Thus, an audio embodiment may be used to provide a searchable database of and search audio files for speech, music, or other audio types for desired characteristics of specified importance. Likewise, embodiments may be directed to content in the form of or represented by text, signals, etc.

It is further noted that the use of the term "engine" in describing embodiments and features of the invention is not intended to be limiting of any particular implementation for accomplishing and/or performing the actions, steps, processes, etc. attributable to and/or performed by the engine. An engine may be, but is not limited to, software, hardware and/or firmware or any combination thereof that performs the specified functions including, but not limited to, any using a general and/or specialized processor in combination with appropriate software. Software may be stored in or using a suitable machine-readable medium such as, but not limited to, random access memory (RAM) and other forms of electronic storage, data storage media such as hard drives, removable media such as CDs and DVDs, etc. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another or different engine, or distributed across one or more engines of various configurations.

It is further noted that the following summary of the invention includes various examples to provide the reader with a context and/or embodiment(s) and thereby assist the reader's understanding and appreciation for and of the related technology. However, unless otherwise stated or evident from context, the examples are by way of illustration only and are not intended or to be considered limiting of the various aspects and features of the invention.

According to an aspect of the invention, a method comprises the steps of receiving a search string; searching for videos satisfying search criteria based on the search string; identifying visual objects in the videos; grouping the videos based on the visual objects; displaying images of the visual objects in association with respective ones of the groups of videos; selecting one of the groups of videos; and displaying a result of the searching step in an order responsive to the selecting step. For example, in response to a search initiate either by entry of a text-based query or a graphically-based search request (e.g., search for images similar to that clicked-on), resultant videos are grouped based on image content, e.g., according to a featured person or object in the video.

According to another aspect of the invention, a method of identifying a video comprises the steps of identifying sequences of frames of the video as comprising respective scenes; determining a visual relevance rank of each of the scenes; selecting a number of the scenes based on the visual relevance rank associated with each of the scenes; identifying, within each of the selected scenes, a representative thumbnail frame; and displaying (i) a first thumbnail corresponding to one of the representative thumbnail frames based on the visual relevance rank of the associated scene and (ii) a filmstrip including an ordered sequence of the representative thumbnail frames.

According to a feature of the invention, the "thumbnails" may include one or more frames (e.g., images) of the corresponding scene of the video, the frame representing (e.g., visually depicting) the scene, typically having been extracted directly from the video. According to other features of the invention, a thumbnail may be a static image extracted from a portion of the frame, an image generated to otherwise correspond to the imagery content of the scene, a dynamic image including motion, and/or an interactive image providing additional viewing and user functionality including zooming, display of adjacent frames of the scene (e.g., a filmstrip of sub-scenes), etc. A user may click on and/or hover over a thumbnail to enlarge the thumbnail, be presented with a preview of the content (e.g., a video clip most relevant to the search terms and criteria) and/or to retrieve or otherwise access the content.

According to a feature of the invention, the method may include linking each of the thumbnails to a corresponding one of the scenes. According to an aspect of the invention, linking may be accomplished by providing a clickable hyperlink to the video and to a location in the video corresponding to start or other portion of the scene so that clicking on the link may initiate playing the video at the selected scene and/or specific frame within the scene. Thus, according to another feature of the invention, the method may include recognizing a selection of one of the thumbnails and playing the video starting at the scene corresponding to the selected thumbnail.

According to another feature of the invention, the visual relevance rank may be based on a visual importance of the associated scene. For example, certain frames may be more visually informative and/or important to a user about the content of the scene including frames depicting people and faces, frames including an object determined to be important to the scene based on object placement, lighting, size, etc. In contrast, frames having certain characteristic may be less informative, interesting and/or important to a user in making a selection including frames having low contrast, little or no detected motion of a central object or no central object, frames having significant amounts of text, etc. These less interesting frames may be ranked lower than the more interesting frames and/or have their ranking decreased.

According to another feature of the invention, the visual relevance rank may be based on a contextual importance of the associated scene. For example, the frame may include an object that satisfies search criteria that resulted in identification and/or selection of the video such as a face or person in the video that was the subject of the search or other reason why the video was identified. Frames containing the target object may be ranked more highly and thereby selected for display over other frames.

According to another feature of the invention, the step of identifying may include designating a type of object to be included in each of the representative thumbnail frames. For example, a user may select "faces only" so that only frames depicting human faces are displayed while the display of other frames may be suppressed. The type of object may be selected and include, for example, faces, people, cars, and moving objects.

According to another feature of the invention, the visual relevance rank of a scene may be downgraded for those scenes having specified characteristics. For example, frames types determined to be less likely to provide useful information to a user in determining the content of a video, video scene, clip, etc. may be suppressed. Low interest frames may include frames with low contract, lacking identifiable human faces (sometimes referenced herein as "no faces"), or other visual indicia discernable from the content of the frame and/or those frames not clearly including a targeted search object may be ranked lower and/or their ranking decreased to suppress display of those frames as part of a filmstrip presentation of the video.

According to another feature of the invention, the specified characteristics may be selected from the group consisting of scenes having low contrast images, scenes having a significant textual content and scenes having relatively little or no or little foreground object motion.

According to another feature of the invention, the step of identifying sequences of frames of the video as comprising respective scenes may include identifying one or more regions of interest appearing in the frames and segmenting sequences of the frames into scenes based on continuity of objects appearing in frames of the sequences of frames. For example, a scene may be defined as those frames including images of a certain set of objects such as faces.

According to another feature of the invention, the step of identifying sequences of frames of the video as comprising respective scenes may include identifying objects appearing in the frames and segmenting sequences of the frames into scenes based on continuity of objects appearing in frames of the sequences of frames.

According to another feature of the invention, the step of identifying sequences of frames of the video as comprising respective scenes may include identifying an object appearing in the frames and segmenting sequences of the frames into scenes based the object appearing in frames of the sequences of frames.

According to another feature of the invention, the frames of the sequence of frames may be discontinuous. For example, a scene may be defined as individual but noncontiguous clips (sequences of frames) in which a particular set of objects appear, such as a person, even though the images of that person are interrupted by intervening shots or scenes.

According to another feature of the invention, the step of determining visual relevance rank of each of the scenes may be determined by identifying an object appearing in the scene that correspond to a target object specified by search criteria. According to another feature of the invention, the target object may be a person and/or face wherein the identity of the person is discernable and, more preferable, identifiable.

According to another feature of the invention, the step of determining the visual relevance rank of each of the scenes may include identifying a tube length corresponding to a duration of each of the scenes and, in response, calculating a visual relevance rank score for each of the scenes. According to an aspect of the invention, "tubes" may be data structures or other means of representing time-space threads that track, can be used to track, or define an object or objects across multiple frames.

According to another feature of the invention, the step of identifying, within each of the selected scenes, a representative thumbnail frame may include reviewing frames of each of the selected scenes and selecting a frame as a representative thumbnail including an object visual relevance rank to an associated scene.

According to another feature of the invention, the step of selecting a frame as a representative thumbnail may include identifying an object appearing in a scene that corresponds to a target object specified by search criteria.

According to another feature of the invention, the step of displaying a filmstrip may include ordering the representative thumbnail frames in a temporal sequence corresponding to an order of appearance of the selected scenes in the video. For example, once the thumbnail or frames are ranked to identify the most salient or important frames, the frames are put back into a sequence corresponding to their order of appearance in the video, e.g., back into the original temporal order.

According to another feature of the invention, selection of a thumbnail is detected or identified resulting in the associated video being played. For example, a user may "click on" a thumbnail to play the corresponding video or scene of the video, hover over a thumbnail to play a portion of the video (e.g., the depicted scene), etc.

According to another aspect of the invention, a method of selecting a video to be played includes searching a database of videos to identify videos satisfying some search criteria; displaying links to the videos satisfying the search criteria according to one or more of the methods described above; identifying a selection of a thumbnail associated with one of the identified videos to identify a selected video; and playing the selected video.

According to another aspect of the invention, a method comprises the steps of receiving a search query specifying search criteria; searching for videos satisfying the search criteria; identifying visual objects in the videos; grouping the videos based on the visual objects; and displaying images of the visual objects in association with respective ones of the groups of videos. For example, videos identified or retrieved by the search may be grouped or sorted based on visual content such as who appears in each video.

According to a feature of the invention, the method may include selecting one of the groups of videos and displaying a result of the searching step in an order responsive to the selecting step. For example, if a selected video includes images of a particular identified person, other videos including that person may be pushed up the list order and displayed earlier in a revised listing of search results.

According to another feature of the invention, the objects may comprise images of faces.

According to another feature of the invention, the step of identifying may include determining which of the objects appear most frequently in the videos. For example, if a particular person appears prominently throughout a scene, the scene may be tightly associated with that persons while people and/or objects having a lesser presence in the scene may be less tightly associated.

According to another feature of the invention, the step of identifying may include determining a ranking of the objects. For example, videos having prominently featured and/or identifiable people may be preferred over videos where image content is less well defined.

According to another feature of the invention, the step of ranking the objects may be based on prominency of appearance and duration of each of the objects within the videos.

According to another feature of the invention, the method may further include ranking the objects and increasing a ranking of videos containing the ranked objects based on the rankings of the objects.

According to another feature of the invention, the method may further include displaying links to the videos in an order determined by the rankings of the videos.

According to another aspect of the invention, an apparatus for identifying a video comprises a scene detection engine operating to identify sequences of frames of the video as comprising respective scenes; a scoring engine operating to determine a visual relevance rank of each of the scenes; a scene selection engine operating to select a number of the scenes based on the visual relevance rank associated with each of the scenes; a frame extraction engine operating to identify, within each of the selected scenes, and a representative thumbnail frame; a display engine operating to generate a visual display including (i) a first thumbnail corresponding to one of the representative thumbnail frames based on the visual relevance rank of the associated scene and (ii) a filmstrip including an ordered sequence of the representative thumbnail frames.

According to another aspect of the invention, video browser for searching videos includes a search engine operating to search a database of videos and identify videos satisfying some search criteria; an apparatus for displaying links to the videos satisfying the search criteria as described above; an interface operating to identify a selection of a thumbnail associated with one of the identified videos to identify a selected video; and a video player operating to play the selected video.

According to another aspect of the invention, a computer program comprises a computer usable medium (e.g., memory device and/or medium) having computer readable program code embodied therein, the computer readable program code including computer readable program code for causing the computer to identify sequences of frames of the video as comprising respective scenes; computer readable program code for causing the computer to determine a visual relevance rank of each of the scenes; computer readable program code for causing the computer to select a number of the scenes based on the visual relevance rank associated with each of the scenes; computer readable program code for causing the computer to identify, within each of the selected scenes, a representative thumbnail frame; and computer readable program code for causing the computer to display (i) a first thumbnail corresponding to one of the representative thumbnail frames based on the visual relevance rank of the associated scene and (ii) a filmstrip including an ordered sequence of the representative thumbnail frames.

According to another aspect of the invention, a computer program comprises a computer usable medium having computer readable program code embodied therein, the computer readable program code including computer readable program code for causing the computer to receive a search query specifying search criteria; computer readable program code for causing the computer to search for videos satisfying the search criteria; computer readable program code for causing the computer to identify visual objects in the videos; computer readable program code for causing the computer to group the videos based on the visual objects; and computer readable program code for causing the computer to display images of the visual objects in association with respective ones of the groups of videos.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 5 is another screen shot of the user interface of FIG. 3; and

FIG. 6 is a block diagram of a computer platform for executing computer program code implementing processes and steps according to various embodiments of the invention.

DETAILED DESCRIPTION OF THE PREFERRED EMBODIMENTS

Figure 1:
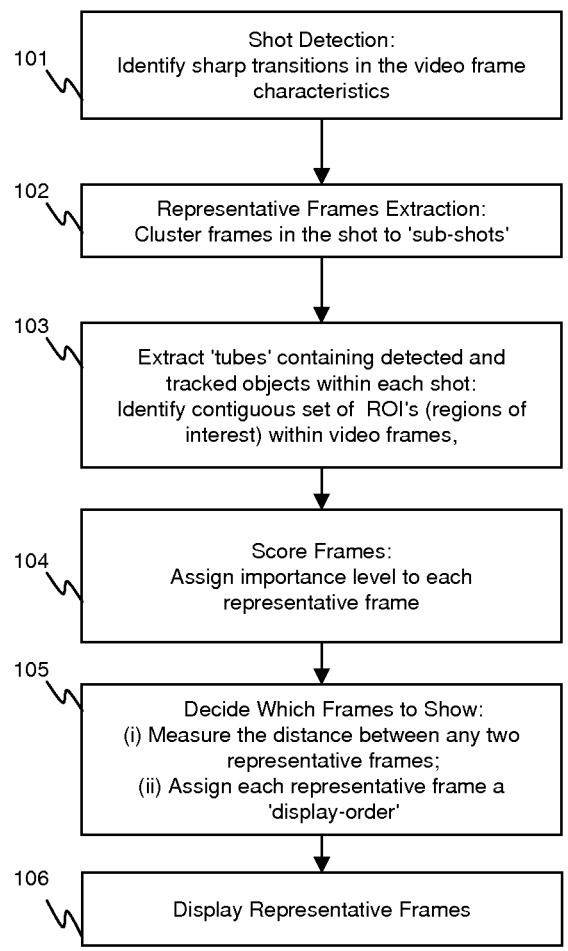
FIG. 1 is a flow chart of a method of extracting frames from videos satisfying some search criteria for display to a user.

While the following preferred embodiment of the invention uses an example based on indexing and searching of video content, e.g., video files, visual objects, etc., embodiments of the invention are equally applicable to processing, organizing, storing and searching a wide range of content types including video, audio, text and signal files. Thus, an audio embodiment may be used to provide a searchable database of and search audio files for speech, music, etc. Likewise, embodiments may be directed to content in the form of or represented by text, signals, etc.

Embodiment of the invention include apparatus, software and method for providing an online analysis of a particular online video result returned, for example by a textual search query, processing both the visual video stream as well as its surrounding textual data, for the purpose of offering the user a summarizing, interactive visualization, search and browsing experience for facilitating watching the video. This feature introduces an interactive visual-relevance-rank 'summary', including thumbnails of the 'relevant' visual content (all most-visually salient hence relevant events, scenes and objects) as they are depicted in the video.

According to an embodiment of the invention, significant and apparent visual elements within a retrieved set of textual search results are detected using appropriate image object extraction engines and technology as described in Applicants' prior patent applications referenced above (and incorporated herein by reference) and extraction engines produced by Videosurf, Inc. of San Mateo, Calif. See also P. Viola and M. Jones, "*Rapid object detection using a boosted cascacd of simple features,*" Proc. Computer Vision and Pattern Recognition, 2001. These video extraction engines technologies isolate, identify and provide tracking of objects appearing in a video and, in particular, objects appearing in one or more frames or images of the video such as, faces, people, and other main/primary objects of interest. The extracted objects are then scored for their relative visual significance within the overall video, ranking their relevance to the video content (i.e. obtaining their "visual relevance rank"). The rank of a visual metric may be, for example, defined to be larger within the video to the extent that the subset of all other prominent video images that are visually similar to it is larger: e.g., a high visual-relevance-rank face is one which an image of the frame appears clearly and prominently many times within the set of images in the video. A visual relevance-rank includes, for example, visual and context importance of a scene. For example, a visual importance may be based on visual characteristics of the scene that a viewer might find important in determining whether the scene is interesting or important to look at such as the presence of people, faces, objects followed by the camera, inclusion of a visually salient object standing out from the background, duration of appearance of an object, object size, contrast, position in the frame, etc. Contextual importance may include, for example, characteristics, inclusion of objects or other features of the scene satisfying some externally specified criteria such as appearance of a person or other object being searched for within the scene.

Representative pictures or frames for the highest visual relevance ranks may be automatically extracted and offered to the user as a thumbnail, 'click on' feature, enabling a 'jump to the depicted moment in the video' experience. According to an embodiment of the invention, pictures identified and extracted to represent the most significant visual elements in the video (highest visual relevance rank) may constitute a the filmstrip-like videos summary, as well as the chosen main video thumbnail.

Upon clicking on any picture in the summary the system may transition into a 'video page' on which it presents or screens to the user the particular summarized video, starting from the particular moment depicted by the particular filmstrip thumbnail clicked (which is generally an image taken form the video).

FIG. 1 is a flowchart of an embodiment of the invention for extracting relevant scenes from a video and displaying a set static or dynamic thumbnails most representative of important scenes and/or features of the video. The thumbnails may include a main (or several primary) thumbnails that is (are) prominently displayed and is (are) considered to be representative of the overall video, indicative of the presence and/or importance of a target object that is identified by search criteria by which the video was selected and/or is (are) indicative of a class or classes of object(s) found within the video (e.g., a particular person or actor, faces, designated objects such as cars, etc.). Together with the main thumbnail a filmstrip may be presented including an ordered set or sequence of minor thumbnails. The thumbnails may be selected from respective segments or scenes appearing within the video that are considered most important and may be particular frames selected from each scene that are most representative of the scene, e.g., are important to the scene. Segment or scene importance may be based on some criteria such as a significant appearance of an identified person within the segment or scene, a duration of an object (e.g., person) within the segment or scene, position and size with respect to, for example, other objects including foreground and background objects and features, etc. Each of the thumbnails of the filmstrip may be selected from frames of the video corresponding to selected scenes of the video. Again, minor thumbnail selection may be optimized to emphasize some important feature of or object appearing in the corresponding scene such as an object corresponding to some search criteria as in the case of the main thumbnail.

Visual Summary of a Video

To display search results representative frames are extracted out of a given video and may be aligned in a row in such a way that each row of images represents the video in the best way to the end use. The various frames of a video identified as a candidate for selection by a user include display of frames for the video based both on their importance in the video and on their difference from each other, making a blend that ends up in showing a variety of the different most important visual moments in the video (see FIG. 3, parts 341 and 343). The overall methodology can be divided into three major component processes or, in the case of an apparatus, engine or processor for performing the following, as will be explained in more detail with reference to FIG. 1 of the drawings:

1. Extracting the frames.
2. Scoring the frames.
3. Deciding which frames to show.

Extracting frames from the video includes shot detection and extraction of representative frames as described in the following sections.

Shot Detection

With reference to step 101 of FIG. 1, detecting or identifying scenes (also referred to as "shots") or a series of related frames associated with a scene within the video typically is accomplished as an initial step. A shot is determined by a sharp transition in the video's frames characteristics. One significant characteristic used may be the color histogram of the underlying image.

For each pair of consecutive frames in the video, the 'distance' between frames is measured in terms of the Bhattacharyya coefficient between the two underlying color histograms of the images. See Bhattacharyya, A. (1943). "*On a measure of divergence between two statistical populations defined by their probability distributions*" and U.S. Patent Publication No. 2008/0193017 entitled "Method for detecting scene boundaries in genre independent videos." Bulletin of the Calcutta Mathematical Society 35: 99-109. MR0010358. These color histograms consist of 64 equi-partitioned bins in the RGB space of the underlying image. Other characteristics of the images can be taken into account, such as the motion between the two images, the objects detected in them and more.

After having the distance d(t) between frame number t and frame number t+1 in the video (for all t values between 1 and the number of frames-1), points in the graph of the function d(t) differ by much from their neighborhood are identified. In more detail, the point $t_0$ is considered as a scene or shot transition whenever $d(t_0)$ is larger by, for example, at least three and, more preferable, at least five standard deviations from a certain version of the moving average of d(t) and is also larger by at least some pre-defined threshold from the same moving average. Also, to avoid random fluctuations being detected as shot transitions, the immediate neighborhood of the candidate $t_0$ is checked to confirm that it is not also detected as a scene or shot transition.

Representative Frames Extraction

Next, at step 102, representative frames may be extracted from each scene or shot by clustering the frames in the shot to 'sub-shots', using a 1-dimensional version of a general clustering method, based on the multi-grid methodology. See also *On Spectral Clustering: Analysis and an algorithm* (2001) by Andrew Y. Ng, Michael I. Jordan, Yair Weiss http://citeseerx.ist.psu.edu/viewdoc/summag?doi=10.1.1.19.8100. A sub-shot is a contiguous set of frames within the shot that has common characteristics—in particular, the frames within any given sub-shot usually come from the same scene in the video. This algorithm also provides a representative frame for each sub-shot—the frame that represents it the most and would be the most suitable to show to the user as the thumbnail of this 'sub-shot'.

A preferred clustering algorithm used is a bottom-up algorithm. It works in O(log(the number of frames)) iterations. The input to the first iteration is the set of all frames in the shot, along with their distances from their two direct neighbors (the neighbors of a frame are the two frames that are displayed right before and right after it). In the first iteration, a subset C=C(0) of the frames is chosen such that every frame is either in C or a neighbor of a frame in C. The distance of any given frame to a member of C is also checked to ensure that it is not too large (compared to a threshold). Then, the output of the first iteration is the set C, along with new distances between neighboring members of the C-set (neighbors here correspond to frames that have only non-C members along the path between them). The set C is the input to the second iteration, which in turn produces a new set C'=C(1) (which is a subset of the set C). The process concludes when the resulting set C(n) contains only frames that are sufficiently distant from their neighbors. Since the size of C(n) is smaller by constant factor than C(n−1), the algorithm is considered to be very fast.

Tubes Extraction

"Tubes" are next extracted at step 103, each tube containing detected and tracked objects within each shot. See K. Okuma, A. Teleghani, N. de Freitas, J. Little and D. Lowe. *A boosted particle filter: Multi-target detection and tracking*, ECCV, 2004 http://www.springerlink.com/content/wvflnw3xw53xjnf3/ for other common methods used to track objects. A tube is a contiguous set of ROI's (regions of interest) within a video's frames, containing a tracked object (e.g. a face)—defining a spatio-temporal region within the video that contains the tracked object. Along with a tube its representative ROI is also defined which then defines its frames. The tube's representative frames are the frames in which the object appears in its most prominent way, and in a way that reflects the variety of appearances of the object in the tube.

The extraction of tubes may be performed as follows. Assuming the availability of a still image based detector for a given object type (e.g. a still image face detector etc.), the detector is applied to special frames of the video, called 'key-frames'. The key-frames are chosen so that every shot will have a key-frame in the beginning of the shot, and the maximum distance between consecutive key-frames will not be larger than a pre-defined number of frames (typically around 40 frames).

Whenever an object is detected in a key-frame, tracking of the object is initiated along the video's frames, until arriving at the next key-frame (or until the end of the shot or scene). Tracking is performed, for example, either by applying the detector once again in the neighborhood of the expected region of interest or by other means of tracking (optical-flow based tracking, mean shift, CAM-shift and more). When the tracking process arrives at a new key-frame, the detector is applied once again on the whole image and the 'live tubes' (those tubes that began in a previous key-frame and were tracked to the current point in the video) are added to the detected object in the appropriate ROI's. The tracking method is based on an Hidden Markov Model (HMM) approach (See for example Lawrence R. Rabiner (February 1989). "*A tutorial on Hidden Markov Models and selected applications in speech recognition*". It is integrating the temporal signal available in video in order to increase the accuracy and the robustness of the method to occlusions, and noise and other factors that usually impede detection that is done on each frame independently. This integration is computed using a dynamic programming method that is most efficient and suitable for HMM (See Aji, S. M. McEliece, R. J. The generalized distributive law: http://ieeexplore.ieee.org/Xplore/login.jsp?url=http%3A%2F%2Fieeexplore.ieee.org%2Fiel5%2F18%2F17872%2F00825794.pdf%3Farnumber%3D825794&authDecision=-203 for further discussion.)

Another kind of tubes is a 'motion tube', where an object is detected by its motion (in contrast to the background). In these cases the fact that an object appears in the tube is detected, although the kind of underlying object may not be detected or identified.

Identifying and Grouping Together Similar Tubes

Identifying large groups of tubes that represent the same object may be important for generating an accurate summary and search relevancy. However, tubes of an object generally appear at different, non-contiguous times with different visual appearances (e.g. a person might look forwards at one scene and then sideways at another). Therefore, tube grouping may be performed by a clustering algorithm that uses a matrix of pairwise similarities between all tubes. Pair-wise similarities may consist of integrating many similarities between corresponding tube parts. This integration of similarities as well as integrating temporal information addresses high object variability: when comparing the parts of two tubes all pairs of corresponding parts from all instances may be compared to provide a good overall match despite a few partial mismatches.

Every part is represented by an image region separated from the background. The direct similarity between corresponding regions (parts) may be measured using one or more of several known methods including but not limited to L2 distance between the regions as well as the L2 distance between features extracted from these regions (e.g. horizontal, diagonal and vertical edges, shift invariance feature transforms (SIFT), see Lowe, David G. (1999). "*Object recognition from local scale-invariant features*". Proceedings of the International Conference on Computer Vision 2: 1150-1157. doi:10.1109/ICCV.1999.790410 or other local features: Mikolajczyk, K.; Schmid, C. (2005). "*A performance evaluation of local descriptors*". IEEE Transactions on Pattern Analysis and Machine Intelligence 27: 1615-1630.).

The direct pairwise similarities are expensive to compute though and computation therefore proceeds in a progressive coarse to fine manner. Each part is assigned with a "signature" that represents its type (e.g. open vs. close mouth). The signatures are determined by comparing each instance part with a large bank of optional signatures. This bank is learned a-priori from many examples and a part signature is determined by matching it with the best one available in the bank. Pairs of instances having dissimilar signatures are filtered out from further comparisons (e.g. closed and an open eye regions are generally not compared). Parts of pairs of tubes that share similar signatures are further compared by the direct method to generate the tubes-similarity matrix for the clustering algorithm. The clustering algorithm then identifies groups of tubes likely to represent a single object. The algorithm is very similar to the bottom-up clustering algorithm mentioned above at the "representative frame extraction" part. Each group is also identified with a representative tube and a representative frame. The grouping process also enables better evaluation of the tube importance in the videos: the bigger a tube's group is, the more important it becomes.

Scoring the Frames

Each representative frame (from both tubes and sub-shots) is given an importance score at step 104, based on its characteristics. A representative frame of a tube is given a higher score, based on the length of the tube in the video and on the detected object (e.g. a frame containing a face gets a higher score than a 'non-face' frame). A text-frame is given a low score (e.g credits at the end of the video). Other features of the frame that affect the score are the 'color-distinctiveness' of the frame (how spread is the distribution of colors in the underlying image), the 'centrality' of the frame (how much is the frame likely to contain an undetected central object—using aggregated color blobs in the image) and other features.

Deciding which Frames to Show

Each representative frame is assigned a 'display-order' at step 105. The display order is a serial or sequence number assigned to each representative frame (from one to the number of representative frames), that determines which frames will be shown. In cases where a single frame is to be shown, that is assigned with display order 1 (the 'main thumbnail'); In cases where ten frames are to be shown (or any other number k), the frames are were assigned with display order 1 to 10 (1 to k, respectively), ordered chronologically by their appearance in the video. See FIG. 3, main thumbnail 341 and visual summary of the video 343.

In order to determine which frames to show the distance between any two representative frames is measured. This distance is based on the underlying detected object (whenever it exists) and general features of the underlying image, such as the distribution of colors in the frame.

The frame with display order 1 is the frame having the maximum score of all representative frames. The frame with display order 2 is the frame that maximizes a weighted sum of its score and the distance measure from the main thumbnail so that a substantially different image than the first one is included while visually similar frames may be excluded from the selection process. After the frames with display order 1, 2, . . . , k have been determined, the k+1'th frame is determined by maximizing the weighted sum of its score and the distance from frames 1, 2, . . . , k (the maximum is taken among the frames not included in the first k frames). Ordering is completed when all of the representative frames have been exhausted. In case that less than a small pre-defined number of representative frames are extracted, further augmentations of the frames is performed by sampling more frames from the video. For example, this is the case where the video is just a video containing a single scene. Finally, at step 106, the representative frames of the video are available for display to the user on their computer or other terminal running the appropriate software (e.g., web browser.). The result is used both on the search results page (see, e.g. FIGS. 3 and 4) and on the video page (see, e.g., FIG. 5).

Visual relevance ranking can be used in various applications to provide an enhanced display of video of interest to a user. One such application includes an interactive web searching application for browsing video content on the Internet and World Wide Web (WWW.) By combining visual relevance rank ranking with an interactive video search engine, a user can "see" inside videos to find content in a fast, efficient, and scalable way. Basing content search on visual identification, rather than text only, a vision-based video search engine provides more relevant results and a better experience to let users find and discover the videos they really want to watch.

2. A Visual-Relevance-Rank Feedback and Subsequent Search

Employing the described visual relevance ranking in a visual search engine provides an online capability to analyze a set of video results returned by a textual search query, processing both the visual streams as well as their surrounding textual data for the purpose of offering the user a subsequent, interactive visual search experience. This feature provides an enhanced interactive visual-relevance-rank improvement of the set of search results served first.

According to an embodiment of the invention, significant and apparent visual elements within a retrieved set of textual search results are detected using appropriate image object extraction technology such as provided by Videosurf's Computer Vision propriety extraction technologies (e.g. faces, people, and main objects of interest). See, e.g., P. Viola, M. Jones "Rapid object detection using a boosted cascade of simple features", Proc. CVPR, Vol. 1 (2001), pp. 511-518. The extracted objected are then scored for their relative visual significance within the entire set of results, ranking this way their relevance to the original textual query submitted by the user (i.e. obtaining their 'visual relevance rank rank'). The rank of a visual entity is defined to be larger within the entire set of retrieved search results to the extent that the subset of other visual entities similar to it is larger; e.g., a high visual-relevance-rank face is one which appears many times within the set of search results (e.g. searching for 'Britney' videos will presumably reproduce many 'Britney' faces, and other faces associated with Britney).

Representative pictures for the highest visual relevance ranks are automatically extracted and offered to the user for a 'click on' feature, enabling a higher visual-relevance-rank subsequent search experience (that is, a 'see more of', and/or 'see more like' experience). According to an embodiment of the invention, pictures identified and extracted to represent the most significant visual elements in the results (highest visual relevance rank rank) are posted, for instance, on a north/top, face-strip bar with a suggestive 'see more of' functionality above the customary main-page offering of the textual search results (see also FIG. 1). The user may then click on any subset of the face-strip pictures so as to increase the relevance within and reordering the entire bulk of returned search results, to surface up and promote the content/faces depicted in those pictures clicked; hence executing a higher visual-relevance-rank as a subsequent, interactive search.

Upon clicking on any picture in the face strip the system makes use of all the available text associated with the video from which this picture is coming (e.g., metadata, text identified in proximity to the video such as a title of the video), all possible tags which may have been associated with the picture itself using any user and/or editorial interaction, and any other available information exposed by way of any visual similarity of this picture, and the elements depicted in it to any other visual content available. The picture clicked may be one of a person to which none or insufficient tagging/text was ever associated anywhere online, but to which other pictures available elsewhere online may be similar enough to suggest that the two pictures are of the same person. Such visual similarity is then exploited to link between all pieces of information, grouping them together and including any resulting newly discovered information in the results of the subsequent search for higher visual-relevance-rank results.

To further explain the functionality of the pictures presented in the top-left of an embodiment of a user interface screen, 'refine results by person'. If these pictures already have tags associated to them these tags will appear in the blue links 322 beneath such picture (see, e.g., blue text located beneath respective thumbnails 321 of visual search area 320 in FIG. 3.) In case a picture has no tag associated to it yet, the same blue link will offer an on-the-spot 'tag me' feature. Upon tagging any such picture, grouping of faces (or other objects) based on visual-similarity may be implemented in order to diffuse and apply the same tag to other appearances of the same face within the face strip. A suitable engine for determining visual similarity is provided by Videosurf, Inc. Moreover, in a similar manner, automatic tagging will be employed to any of the faces in the face-strip by way of associating them with other tagged face appearances which may reside elsewhere in the database, or anywhere else online for that matter.

The referenced engine available from by Videosurf includes its Videosurf product implementing video technology using computer science, machine learning, mathematics and computer vision technologies, combined with any human computation and editorial resources to efficiently analyze all available content for the pictures of high significance and for exposing the visual similarities between all such pictures and the elements appearing in them. The technology may use motion and visual features, as well as visual machine recognition to concentrate on the objects of interest in each of the pictures. The methods are efficient and scalable and can cover large, comprehensive bulks of textual and visual content.

The invention supports embodiments incorporating technologies for detecting the elements of high visual significance in a video, or within a collection of videos. Embodiments and applications include methods and apparatus that provide the following:

1. The contiguous sequences of appearances of each face in a video are detected and each generates a 'face tube'. For each such face-tube the duration of appearance (screen time) is persisted, as well as the face sizes, frontal-views duration/screen-time, etc.

2. Similarly to face-tubes, the more general object 'motion-tubes' are extracted; for detecting and extracting any object which appears to be distinguished and focused on in the video, contiguously through its motion, in all different such instances.

3. Interesting and outstanding motion events and actions are recorded.

4. Interesting and salient visual appearances are recorded.

5. Representative coverage of the overall visual appearances in the video(s) recorded.

Each such significant appearance of any visual element was originally extracted from a specific video to which textual metadata was associated in the initial uploading to the hosting/streaming site (e.g. title, tags, description). This associated text may be used as well as the visual similarity between these extracted elements in order to group them together and serve only different enough visual elements for the 'refine results by person' feature of the higher visual-relevance-rank subsequent search.

According to an embodiment of the invention, a visual search system may include the following steps/processes:

1. A list of popular and common Search Queries may be dynamically is maintained:
   a. The list may be produced editorially, using for example, lists of celebrities, or by mTurk (https://www.mturk.com/mturk/welcome) hired internet users and workers and/or other external sources; and
   b. The system registers the real popular search queries and keeps track 2. For each query in a Search Query List a corresponding resulting set of videos is produced to provide a QV Set (Query-led Video Set).
   a. Each QV Set may be pre-processed to extract some or all of its important face-tube groups
      i Each face-tube group represents one interesting face
   b. Each video may belong to several QV Sets.

3. Groups of similar face-tube within the QV Sets are being formed prior and alongside to their visual similarity through the 'Tagged Appearances' (human or automatic tagging of some face tubes).
   a. Seeded at the tagged-appearances ground truth a tube-2-tube visual similarity/recognition score between all tubes may be followed by a grouping mechanism to generate the major face-tube groups (pair-wise scores plus clustering.)

4. For a search already listed in our Search Query List, a group of representative pictures for Visual Search may be prepared offline, similar to the following online operation 5. Given a new search performed in real time, if it does not already belong to the Search Query List, its list of high-relevance videos V1, . . . VN is processed, each of which belongs at most to only few QV Sets by design.
   a. For each of these few QV Set a few main face-tube groups are obtained, intersected with V1, . . . VN
   b. For each such face-tube group a representative picture for Visual Search is brought up.
   c. Once clicked each such picture is brought up to the top of the results of all videos for which the corresponding face-tube group is major component.
      i. Tags associated with the picture chosen from the visual search should enhance the scoring of videos carrying those tags.

6. Freshness: for a new video we *'temporarily assign'* the face-tube groups/people it belongs to by data/text similarity to videos in these groups. Later on face-tube visual indexing should become immediate and done as soon as a new video, especially from popular and high quality sources, arrives.

7. Note: the searches performed, and all clicks may be registered for immediate reinforcement and future use.

Figure 2:
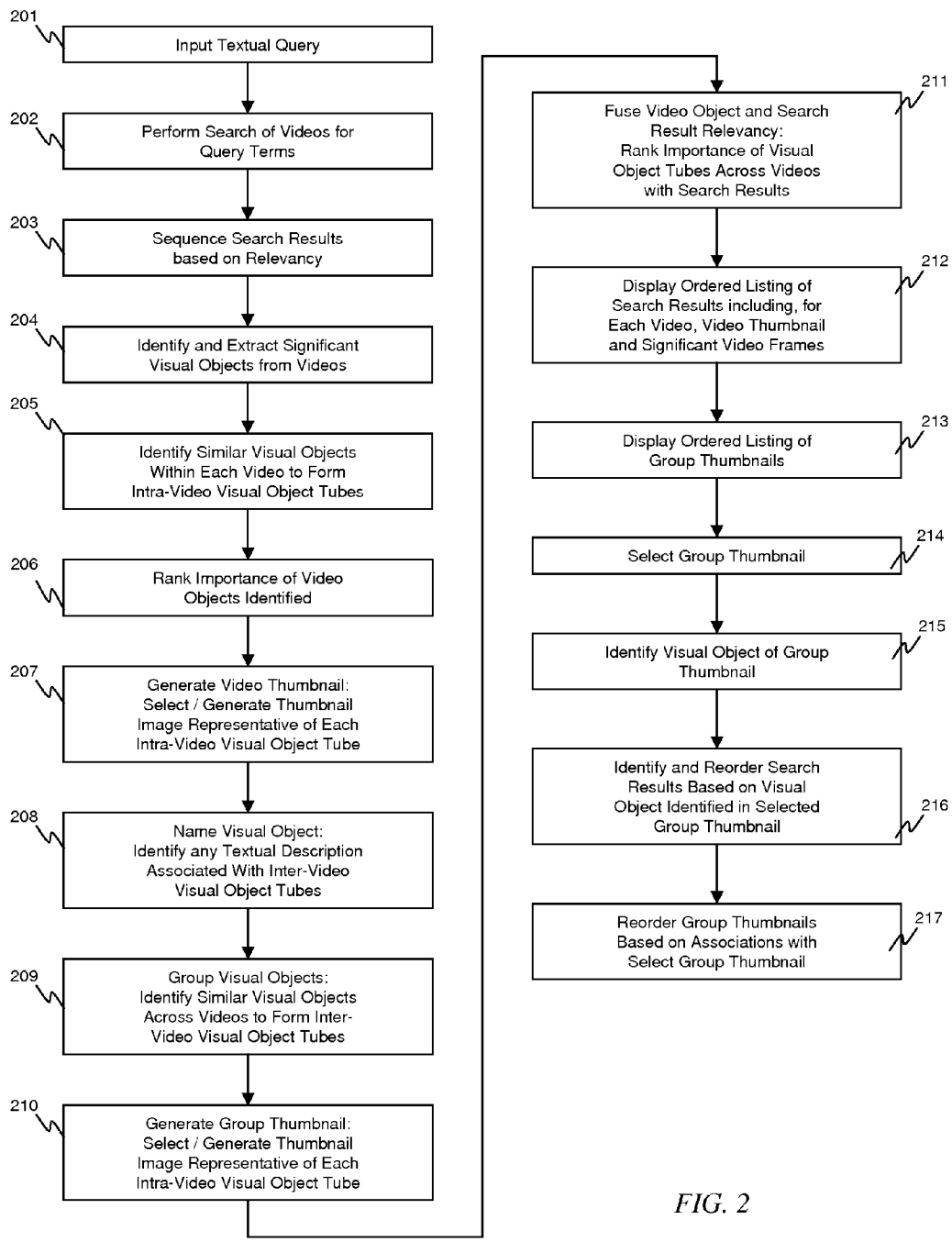
FIG. 2 is a flow chart of a method searching for and retrieving content based on visual relevance rank of objects identified searched videos.

FIG. 2 is a flowchart of an embodiment of the invention. At 201 a user may input a search string or expression. A search for appropriate content, such as videos, photos, etc., is performed at 202 based on the search terms or query. The search may be conducted over and/or using several databases and facilities such as the Internet. The search results are ranked at 203 so that the most relevant are identified. At 204 image extraction identifies significant visual object present in the search results. For example, objects identified as a person present within the video may be identified and extracted, with similar objects identified and tracked through each video at 205. At 206 a ranking may be performed to identify a significance of the tracked object within the video. Criteria may include the relative size of the visual object, percentage of time that the object is present in the video, etc. A video thumbnail representing the extracted visual object is generated at 207 and associated with the respective intra-video visual object tube. Step 208 provides for labeling or naming the visual object. This may be done automatically by the use of associated metadata, a search for similar object that have been previously identified and labeled, or the use of other recognition techniques. Alternatively, a user may be prompted to input a label for the visual object. Alternatively, identification and labeling of the visual object may be performed after visual object are grouped to identify visual objects present in multiple videos thereby forming inter-video visual object tubes.

At 209 visual object common to multiple videos form the basis of grouping those videos to form a visual object tube. Step 210 selects and/or generates a suitable thumbnail representative of the visual object tube, e.g., depicting a person or object appearing throughout the group of videos. These thumbnails may then be displayed across, for example, a top portion of the display, e.g., inter-video visual objects thumbnails 102 as shown in FIG. 1. The groups also may be ranked for relevancy to the original search query by fusing a quality of match metric resulting from the textual search with a weighting from the visual object extraction process. This overall ranking may be used at 212 to display an ordered listing of search results at 213 (see search results 105 of FIG. 1).

At 214 A user may then select a group thumbnail 103 of interest and/or label one of more thumbnail 104 at step 215. Upon selecting a visual object of interest, the search results display 105 may be reordered at 216 to show videos including the selected video object, again ranked based on one or more criteria. The visual object listing 102 may be similarly reordered based on the selection.

Figure 3:
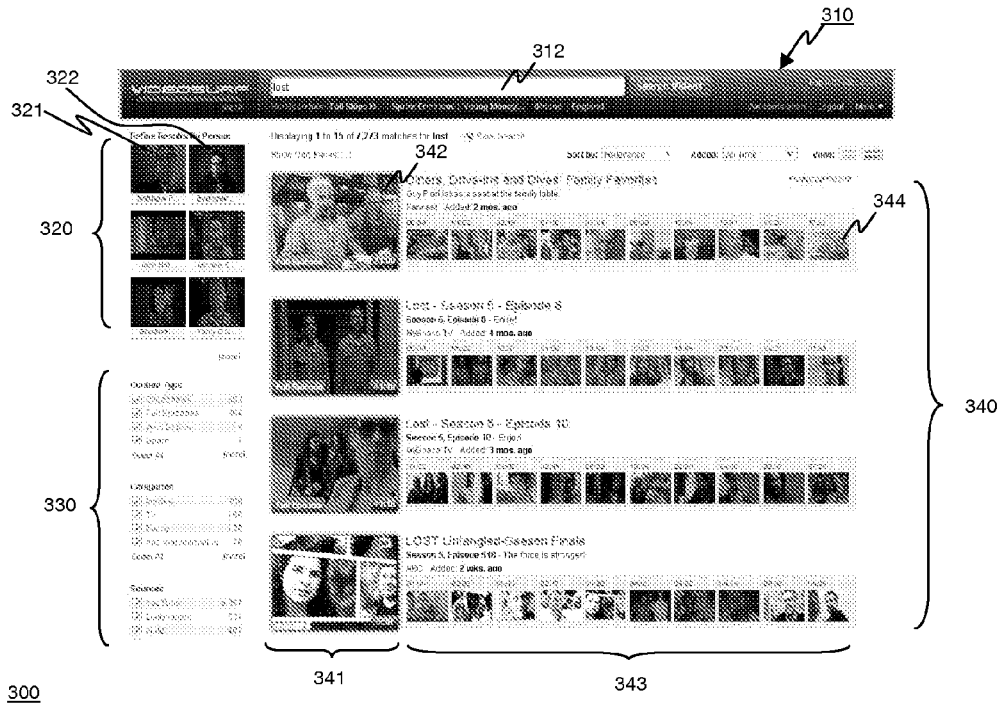
FIG. 3 is a screen shot of a user interface used to enter search criteria for identifying a target video, display results in a ranked order, and provide for interactive refinement of search criteria.

FIG. 3 is a screen shot or screen capture of a user interface screen according to an embodiment of the invention. The interface may include an advanced-options bar 310 including a text-bar input area 312 allowing a user to input a search string or expression describing targeted objects, such as videos, to be located and identified. Objects, e.g., videos, satisfying the search criteria may be listed and displayed in order of relevance. For example, those videos matching the search string in the title of the video may be considered more significant or a better match than videos wherein the search string is only found in metadata associated with the video.

Other criteria may include popularity, frequency, number and recency of accesses/references to a video, quality and length. Each matching video may be represented by a characteristic of main thumbnail 342 and series of thumbnail images 344 from the video in the form of a filmstrip also called a "video summary.". Characteristic thumbnail 342 may be obtained by extracting a most significant visual object identified in each video to define intra-video visual object tubes. Grouping of the most significant visual objects found amongst the search results may be performed to identify significant objects to define inter-video visual object tubes. The inter-video object tubes may be ranked and displayed as represented by appropriate spotlight-like thumbnails 321 depicting an object (e.g., face) that forms the basis of the inter-video object tube (e.g., an image of a person that is included in and/or the subject of the videos within and forming a group of videos). Such highest-rank inter-video objects (see 321) are suggested to the user in the "Refine Results by Person' feature to click on, leading to a subsequent search as depicted in FIG. 4.

Figure 4:
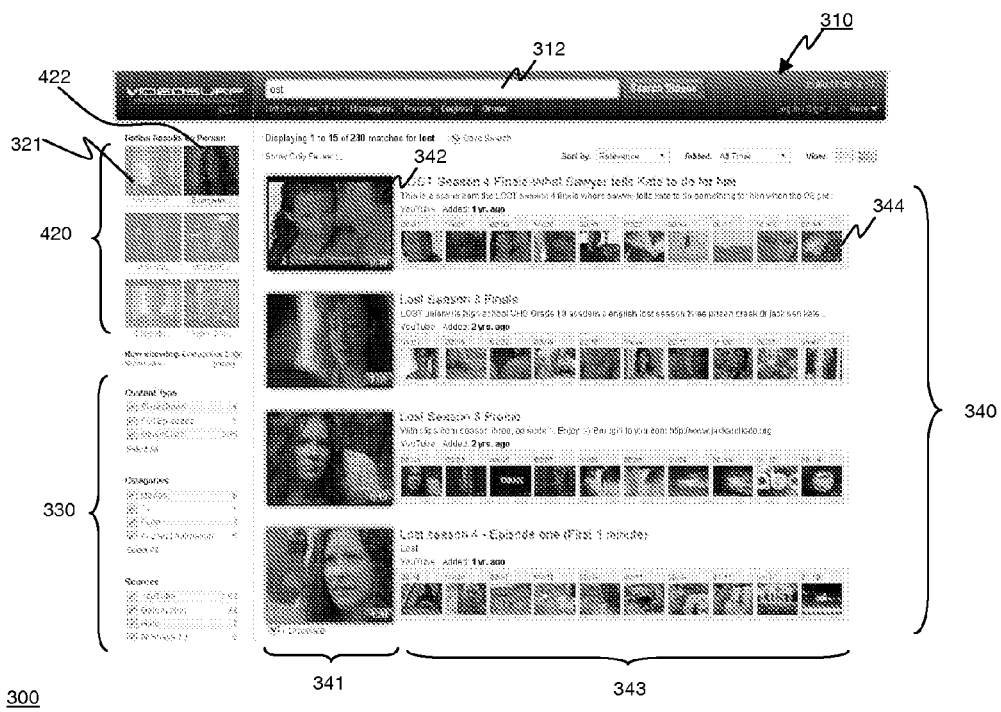
FIG. 4 is another screen shot of the user interface of FIG. 3.

An example of a text search followed by a video search is depicted in FIGS. 3 and 4. FIG. 3 is a screen shot displaying the search results for the text query 'lost' and the most relevant videos it retrieves. As shown, the four most relevant search results are displayed, together with snapshot or clips from the associated video while many more videos with lower relevancy are available by scrolling down using the right-hand scroll bar. FIG. 4 is a screen shot showing the results of a subsequent image or video search, displaying results after a user clicks on, for example, the top-second-left celebrity in the Visual-Search top-left 'Refine Results by Person' feature 420 (e.g., a celebrity such as Evangeline Lilly; see 422 denoted also by being the only image in this feature remaining highlighted). According to this example and an embodiment of the invention, the order of the top-relevant videos changes with respect the presence of the person (in this example, celebrity Evangeline Lilly) in these top videos, as well as the thumbnails and the summary clips that are likewise changed to represent the celebrity Evangeline Lilly intra-vids groups. FIG. 5 is a screenshot resulting from selection of a video to be played, the selected video retrieved (if required) and then played by a suitable media or video player in a major portion of the screen. The thumbnails constituting the associated filmstrip depicting scenes detected within the video may be displayed, for example, along a bottom of the screen. A window along another portion of the screen (in this case, along the right of the screen) may provide textual information about the video or clip to be or being played, provide for selection of related or suggested videos, and provide other functionalities.

FIG. 6 is a block diagram of a computer platform for executing computer program code implementing processes and steps according to various embodiments of the invention. Object processing and database searching may be performed by computer system 600 in which central processing unit (CPU) 601 is coupled to system bus 602. CPU 601 may be any general purpose CPU. The present invention is not restricted by the architecture of CPU 601 (or other components of exemplary system 600) as long as CPU 601 (and other components of system 600) supports the inventive operations as described herein. CPU 601 may execute the various logical instructions according to embodiments of the present invention. For example, CPU 601 may execute machine-level instructions according to the exemplary operational flows described above in conjunction with FIGS. 1 and 2.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold/store user and system data and programs, such as a machine-readable and/or executable program of instructions for object extraction and/or video indexing according to embodiments of the present invention.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing data for operations of the system (e.g., storage of videos and related information). Although RAM 603, ROM 604 and/or storage device(s) 606 may include media suitable for storing a program of instructions for video process, object extraction and/or video indexing according to embodiments of the present invention, those having removable media may also be used to load the program and/or bulk data such as large video files.

Communications adapter 611 is preferably adapted to couple computer system 600 to network 612, which may enable information to be input to and/or output from system 600 via such network 612 (e.g., the Internet or other wide-area network, a local-area network, a public or private switched telephony network, a wireless network, any combination of the foregoing). For instance, users identifying or otherwise supplying a video for processing may remotely input access information or video files to system 600 via network 612 from a remote computer. User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display information regarding a video being processed and providing for interaction of a local user or system operator during object extraction and/or video indexing operations.

It shall be appreciated that the present invention and embodiments thereof are not limited to the architecture of system 600. For example, any suitable processor-based device may be utilized for implementing object extraction and video indexing, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

It should also be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

The invention claimed is:

1. A computer implemented method of identifying video content and displaying representative frames of said video content, comprising the steps of:
   extracting frames from the video content, the extracting identifying for the video content, sequences of frames of each video comprising scenes and determining representative frames for the scenes;
   identifying one or more visual objects appearing in each of the scenes that correspond to a target object specified by search criteria;
   extracting the visual objects from the scenes;
   extracting contiguous regions of interest containing detected and tracked visual objects within each scene by identifying contiguous regions of interest within each scene each region of interest comprising a region within a video's frames containing a tracked object;
   grouping similar regions of interest together into tubes;
   grouping similar non-contiguous tubes;
   identifying representative frames in each contiguous region of interest; and
   determining, for the video content, a visual relevance rank of each of the scenes, wherein the step of determining the visual relevance rank of each of the scenes comprises
   scoring each of the representative frames by assigning an importance level to each of the representative frames and based on a group size of groups of tubes,
   determining, for each of the video content, whether to display the representative frame within each of selected scenes based on the visual relevance rank associated with each of the scenes; and
   displaying at least the representative frame based on the visual relevance rank for each of the video content.

2. The method according to claim 1 wherein the visual relevance rank is based on a visual importance of a scene.

3. The method according to claim 1 wherein the visual relevance rank is based on a contextual importance of a scene.

4. The method according to claim 1 wherein the step of extracting includes designating a type of object to be included in each of the representative thumbnail frames.

5. The method according to claim 2 wherein the type of object is selected from the group consisting of faces, people, cars and moving objects.

6. The method according to claim 1 wherein the visual relevance rank of a scene is downgraded for those scenes having specified characteristics.

7. The method according to claim 6 wherein specified characteristics are selected from the group consisting of scenes having low contrast images, scenes having a significant textual content and scenes having relatively little or no motion.

8. The method according to claim 1 wherein the step of determining the visual relevance rank of each of the scenes includes identifying a tube length corresponding to a duration of each of the scenes and calculating a visual relevance rank score for each of the scenes.

9. The method according to claim 1 wherein the step of selecting a frame as a representative thumbnail includes identifying an object appearing in a scene that corresponds to a target object specified by search criteria.

10. An apparatus for identifying and displaying selected video content comprising:
    a scene detection engine operable to identify, for each of multiple videos, sequences of frames of each video as comprising respective scenes, the scene detection engine operable to identify one or more visual objects appearing in each of the scenes that correspond to a target object specified by search criteria;
    a scoring engine operable to determine, for each of the video content, a visual relevance rank of each of the scenes by:
       extracting contiguous regions of interest containing detected and tracked visual objects within each scene by identifying contiguous regions of interest within each scene;
       grouping similar regions of interest together into tubes;
       grouping similar non-contiguous tubes;
       identifying representative frames in each contiguous region of interest;
       scoring each of the scenes by assigning an importance level to each of the representative frames, and based at least on a length of grouped similar tubes containing the detected and tracked object; and
    a scene selection engine operable to select, for each of the video content, a number of the scenes based on the visual relevance rank associated with each of the scenes; and
    a frame extraction engine operable to identify, for each of the video content, a representative frame for each of the scenes; and
    a display coupled to a display engine adapted to display at least the representative frame for each of the video content.

11. The apparatus according to claim 10 wherein the visual relevance rank is based on a visual importance of a scene.

12. The apparatus according to claim 10 wherein the visual relevance rank is based on a contextual importance of a scene.

13. The apparatus according to claim 10 wherein the frame extraction engine further operates to identify frames within each of scenes containing a particular type of object.

14. The apparatus according to claim 10 wherein the scene detection engine operates to identify objects appearing in the frames and segment sequences of the frames into scenes based on continuity of objects appearing in frames of the sequences of frames.

15. A computer storage device having computer readable program code embodied therein, the computer readable program code causing a processing device to perform steps comprising:
    receiving a search query specifying search criteria;
    searching for videos satisfying the search criteria;
    identifying one or more visual objects that correspond to a target object specified by search criteria in each video of video search results returned by the search query by:
       identifying, for each of video search results, sequences of frames of each video as comprising respective scenes;
       extracting contiguous regions of interest containing detected and tracked objects within each scene by identifying contiguous regions of interest within each scene;
       determining, for each of the video search results, a visual relevance rank of each of the scenes, wherein the step of determining the visual relevance rank of each of the scenes comprises:
          grouping similar regions of interest together into tubes;

grouping similar non-contiguous tubes;
identifying representative frames in each contiguous region of interest;
scoring each of the representative frames by assigning an importance level to each of the frames; and
grouping the visual objects present in multiple of the videos of the video search results;
scoring each of the scenes by assigning an importance level to each of the representative frames, and based at least on grouped similar tubes containing the detected and tracked object;
and
displaying an image for each visual object grouping along with the video search results.

16. The computer storage device according to claim 15 wherein the visual relevance rank is based on a visual importance of a scene.

17. The computer storage device according to claim 16 wherein the visual relevance rank is based on a contextual importance of the scene.

18. The computer storage device according to claim 17 wherein identifying representative frames within each of the scenes includes identifying frames containing a particular type of object.

19. The computer storage device according to claim 18 wherein identifying representative frames within each of the scenes includes identifying objects appearing in the frames and segmenting sequences of the frames into scenes based on continuity of objects appearing in frames of the sequences of frames.

* * * * *